United States Patent [19]
Ludloff

[11] 3,817,092

[45] June 18, 1974

[54] METHOD OF MEASURING TORQUE

[75] Inventor: Karl Ludloff, Los Angeles, Calif.

[73] Assignee: Rotodyne, Inc., Berkeley, Calif.

[22] Filed: Apr. 7, 1971

[21] Appl. No.: 132,007

[52] U.S. Cl. .............................. 73/133 R, 73/116
[51] Int. Cl. ...................... G01l 3/24, G01m 15/00
[58] Field of Search.......... 73/136 R, 133, 116, 117

[56] References Cited
UNITED STATES PATENTS

| | | | |
|---|---|---|---|
| 2,637,204 | 5/1953 | Short | 73/116 |
| 2,674,125 | 4/1954 | Eagan | 73/136 R |
| 2,685,199 | 8/1954 | Wilson et al. | 73/136 R X |
| 3,052,117 | 9/1962 | Miller et al. | 73/136 R |
| 3,175,394 | 3/1965 | Novas | 73/136 R |
| 3,299,698 | 1/1967 | Spiess et al. | 73/136 R |
| 3,505,863 | 4/1970 | Lucia | 73/136 R X |
| 3,554,022 | 1/1971 | Geul | 73/117 |
| 3,581,561 | 6/1971 | Tomashek et al. | 73/117.2 |

*Primary Examiner*—Charles A. Ruehl

[57] ABSTRACT

The method for measuring torque described is based upon the fact that angular velocity $\omega$ and angular acceleration $\alpha$ are independent dynamical variables at any given time. Thus, for any given $\omega$, a simultaneous determination of $\alpha$ and $\omega$ can be utilized for a determination of power. The method of measurement requires a negligible perturbation of the rotating system. It is easily susceptible to modification over a wide range of variations.

8 Claims, 3 Drawing Figures

METHOD OF MEASURING TORQUE

BACKGROUND OF INVENTION

The present invention is directed to a new method of measuring torque, based upon the fact that part of the torque produced by a system with rotating elements (hereinafter referred to as rotating systems) must be used to overcome the inertia of said rotating elements.

While we will use in this specification reference to measurements of power P, or of torque N, or of angular acceleration $\alpha$, it should be understood that because of the relationships existing between these quantities, said relationships involving angular velocity $\omega$ and moment of inertia and being known in this art, power, or torque, or angular acceleration may be used in the descriptive sense to include all three of these quantities as well as the time rate of change of the square of the angular velocity.

The difference in principle between the method for measuring power described herein and existing dynamometer measurements can be seen readily from the equation that relates the torque $N$ on a system to the time rate of change of the angular momentum ($dL/dt$) of that system, i.e.

$$dL/dt = N. \tag{1}$$

This equation is the analogue, for a rotating system, of Newton's second law of dynamics, and is in fact derived from this law.

Existing dynamometers determine the torque produced by a contrivance by balancing it against a known external load, i.e., they determine the physical quantity represented by the right-hand side of equation given above. The method specified herein involves determining the time rate of change of the angular momentum of the rotating elements internal to the system, i.e., determining the physical quantity represented by the left-hand side of equation given above. This is done by making use of the relation between time rate of change of angular momentum, moment of inertia I, and the angular acceleration $\alpha$, i.e., the time rate of change of angular velocity, resulting in the equation $$dL/dt = I\alpha. \tag{2}$$

The moment of inertia is taken to be known, since this is a quantity which is either previously provided for a given system, or can be determined by those working in this art. The determination of $\alpha$ is combined with the known value of $I$ to give $dL/dt$ and hence by equation, given above, the value of $N$ to be determined.

The fundamentally new concept in the method specified herein is based upon the fact that angular velocity $\omega$ and angular acceleration $\alpha$ are independent dynamical variables at any given time. Hence, for any given $\omega$, a simultaneous determination of $\alpha$ and $\omega$ can be utilized for a determination of power. Furthermore, the method of measurement specified herein entails a negligible perturbation of the rotating system (weak-probe measurement). In contrast, although present dynamometers allow determination of $\omega$ by a weak-probe measurement, they require a strong coupling to an external system to determine torque (strong-probe measurement). For example, a tachometer measurement can presently be made during a vehicle's normal performance without affecting the value of $\omega$ being determined (weak-probe measurement). However, present methods dissipate practically the entire torque being measured (strong-probe measurement) and require taking the vehicle out of its normal mode of operation. The weak-probe method of determining torque specified herein thus leads to the first completely weak-probe dynamometer, allowing power measurements under fully dynamic conditions, and thereby opening whole new fields of application precluded with a strong-probe dynamometer, such as monitoring and control systems linked to continuous power determination in any desired mode of a vehicle's operation.

It is contemplated that various instruments will accomplish the above measurements. It is further contemplated that a single device with suitable electronic circuitry will determine both of the independent variables $\omega$ and $\alpha$ and thereby power, although such a device is not necessary for the method disclosed herein.

While throughout this description examples will be cited of devices, circuits and techniques, it should be understood that these cited examples are not to be taken in a restrictive sense, but are limited in scope and in number to improve the clarity and coherence of this disclosure. The proliferation of devices, circuits, techniques, and of applications of the method and devices will be readily apparent to those skilled in the art, and they are intended to be included as a part hereof.

Figure 1:
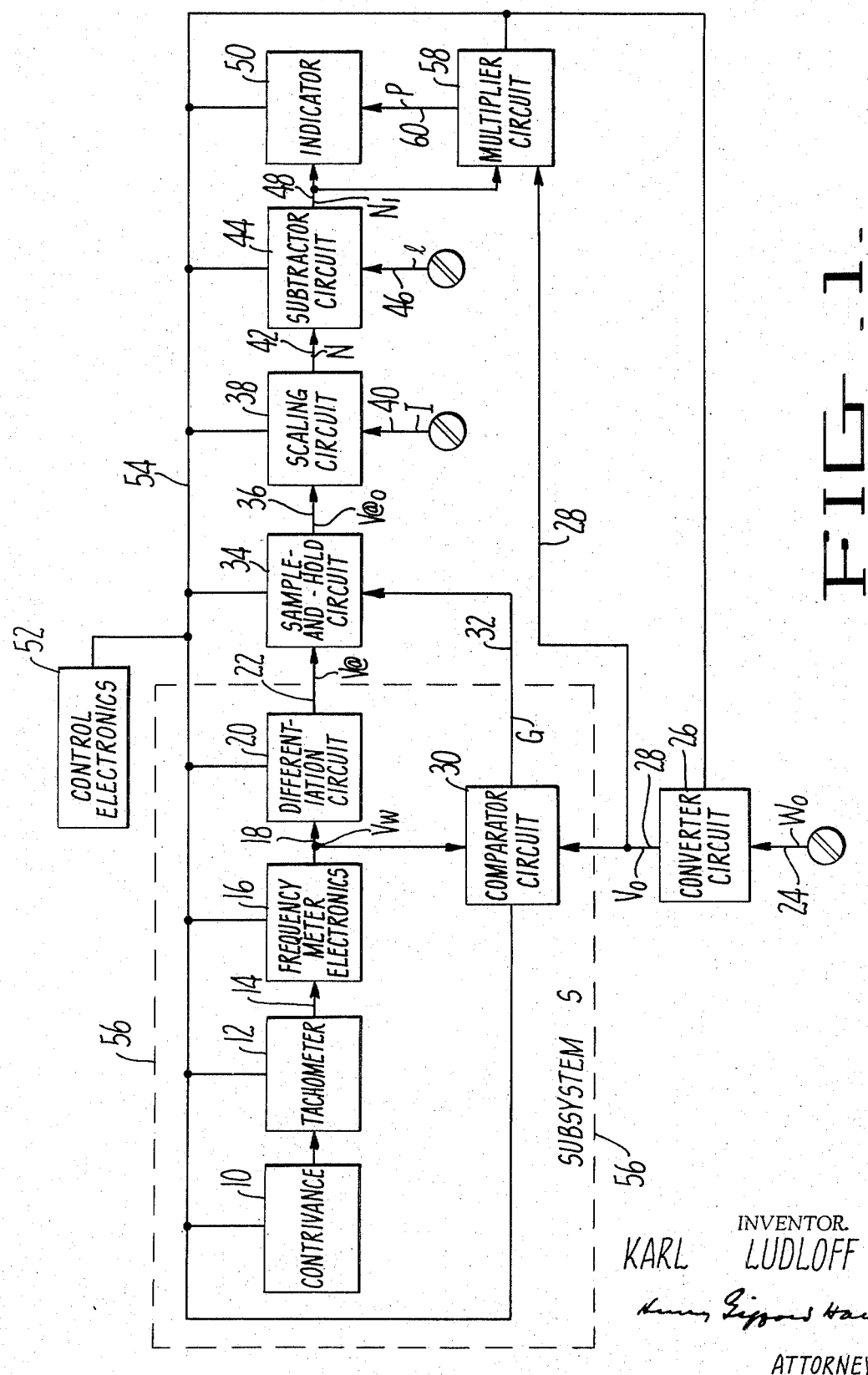
FIG. 1 is a block diagram of a torquemeter and dynamometer circuit for single point measurements.

The torquemeter illustrated in FIG. 1 includes a contrivance (a rotating system) 10 whose output torque is to be determined. For example, if the contrivance were an automobile with a rotary engine, said output could refer to the direct torque output of the engine or to the torque output at the rear wheels, said latter torque differing from said former torque by system losses.

A tachometer 12 is coupled directly by conventional means to a rotating element of said contrivance 10, and is to measure the angular velocity $\omega$ of said rotating element, a known relationship existing between the angular velocity of said rotating element and the angular velocity $\omega$ of any other rotating element of said contrivance 10 which could be used to determine the output torque of said contrivance 10.

Different methods of measuring $\omega$ and $\alpha$ are possible, such as electrical, electronic, mechanical, electromechanical, optical, and even nuclear methods. Furthermore while the terms electrical, electronic or electromechanical in describing a signal, circuit, device or measurement may be referred to herein, it should be understood that such terms are used in the descriptive sense to include any or all such terms when applicable.

The output 14 of said tachometer is coupled by conventional means into an electronic circuit 16 that converts said output 14 into an electrical signal 18 called $V\omega$, representing the angular velocity $\omega$. The type of said electronic circuit 16 required, as described below, will depend in part upon said tachometer 12 used and the accuracy of measurement required.

Many suitable tachometers are well known to those skilled in this art and include, for example, (1) those based upon the Faraday induction effect, and (2) those from which binary outputs are obtained at fixed and known angular positions of a rotating element, as for example, from the breaker points of an automobile ignition system.

If said tachometer 12 is derived from the breaker points of a rotating engine, then said electronic circuit 16 could, by conventional means, convert the rate of breaker-point closures into an electric analog signal, said analog signal being proportional to the rate of breaker-point closures per unit time and hence proportional to the angular velocity of said breaker-point system. The lack of information concerning the state of the rotating system between breaker-point closures (usually referred to as dead time or resolution) limits the accuracy of measurements based on breaker-point systems. In actual practice dead time need not be a real limitation since the state of the art is such that angular position, or degrees, can be subdivided almost without limit down to microscopic levels, if necessary. Hence the time interval between successive binary outputs from a sufficiently sophisticated tachometer coupled to even the slowest rotating element of practical interest, can be made vanishingly small, e.g., instantaneous.

An electronic circuit 20, whose input is the electrical signal 18, $V\omega$, performs the mathematical operation of differentiation to yield as output 22 an electrical signal $V_\alpha$, equal to the time rate of change of 18, $V_\omega$ and representing the angular acceleration. Various known techniques are available to perform the desired operation, and a few electrical ones are given herein as illustrations.

I. Analog Method: Utilizing conventional techniques, signal 18, $V_\omega$ is in effect applied across the terminals of a capacitor and a measurement is made of the current flowing through said capacitor as a result of the applied voltage 18, $V_\omega$, said current being directly related to the time rate of change of $V_\omega$, and hence in effect, is a measure of output 22, $V_\alpha$.

II. Digital method: $V_\omega(t)$ and $V_\omega(t+Dt)$ are measured, where Dt is a known time interval and is smaller than any time interval of practical interest but large enough to achieve simplicity of electronic design. These two signals and $Dt$ are combined utilizing conventional digital techniques to compute the desired result, $$V\alpha \cong [V\omega\ (t+Dt) - V\omega\ (t)]/Dt.$$

III. Instantaneous method: It is to be distinguished at this point in the description between determination of the instantaneous and the average angular acceleration $\alpha$, exemplified by the analog and digital methods just referred to. The analog method is instantaneous since a continuous relationship exists between $V_\omega$, representing $\omega$, and $V_\alpha$, representing $\alpha$. The digital method, on the other hand, requires two successive measurements for the determination of $V_\alpha$, and hence is not instantaneous, although in the limit of a vanishingly small $Dt$ it becomes instantaneous. We note further that in the analog method, as applied to a breaker-point type of tachometer, for example, although the determination of $V_\alpha$ is instantaneous, that of $V_\omega$ becomes instantaneous only in the limiting case of a vanishingly small dead time.

A selected value 24 of $\omega$, called $\omega_0$, is converted by electronic circuit 26 into the electrical signal 28, $V_0$. This can be accomplished by conventional means, for example, by a potentiometer mounted on the dashboard of an automobile or coupled to the throttle of an automobile or of a boat. The electronic circuit 30 compares the two signals 18, $V\omega$ and 28, $V_0$ and, if the circuit 30 is in the enabled or ready-to-function state, it gives as an output the signal 32, $G$ at the time when 18, $V\omega$ passes through the value of 28, $V_0$. The circuit 30 includes means for being enabled and can include means for being disabled automatically after the signal 32, $G$ or on command from some other source. Signal 32, $G$ also indicates whether 18, $V\omega$ is increasing or decreasing when it passes through the value of 28, $V_0$, although this information can be incorporated into the enabling circuitry. The techniques for realizing these functions are all well known in this art. On command from signal 32, G, the electronic circuit 34, by conventional means, causes the value of 22, $V\alpha$ at that time to be stored. This particular value of 22, $V\alpha$ is called 36, $V\alpha_0$ and represents $\alpha$ at the time when $\omega$ equals $\omega_0$. The electronic circuit 38 functions to account for the known moment of inertia 40, I of the system by providing for the multiplication of said signal 36, $V\alpha_0$ by said input I, 40, the result of said multiplication becoming the output signal 42 from circuit 38, called $N$, and representing the uncorrected value of torque measured at $\omega$ equal to $\omega_0$. While the positioning of electronic circuit 38 is placed after circuit 34 as shown, it should be understood that said circuit 38 could have equally well, or even more simply, been positioned elsewhere, as will be readily apparent. The optional electronic circuit 44 modifies the signal 42, $N$ to compensate for external load losses and for internal system losses, said losses called $l$, 46, in a manner discussed in more detail in connection with FIG. 2, said modified signal 48, $N_1$ representing the corrected value of torque to be determined. The indicator 50 functions to display or record said value of torque $N_1$, 48 to be determined. This indicator 50 could consist, for example, of a simple panel meter, a recording device or a digital readout device and is optional.

Electronic control circuitry 52 with interconnecting signal control paths 54, as required, is utilized to reset circuits to a prescribed state, to enable circuits as necessary, as for example the comparator circuit 30 or a tape readout device, to reset and disable appropriate circuits when their respective functions have been fulfilled, and to perform other such conventional functions.

The subsystem of elements 10 through 22, 28, 30, 32 and 54 in FIG. 1, which are described above, form a subsystem which will hereinafter be referred to as Subsystem S, 56, and indicated generally by the broken lines.

The torquemeter described above is combined with the electronic circuit 58 to form the dynamometer illustrated in FIG. 1. The circuit 58 mixes the signal 28, $V_o$ with the signal 48, $N_1$ to yield the output signal P, 60, representing the power set out to be determined.

The torquemeter and dynamometer illustrated in FIG. 1 are significant in that they take single-point measurements, and in that the moment of inertia I, 40 and the external load losses and the internal system losses $l$, 46 could be considered constant over the measurement range of $\omega_o$, 24. In many cases of interest, as for example a motor in motion, load conditions will vary, necessitating additional measurements. Next is considered how the effect of slowly varying or fixed unknown loads can be eliminated to yield the desired measurements, as is the case with the example of torquemeter and dynamometer illustrated in FIG. 2. By slowly varying is meant sufficiently slowly varying to be considered constant over the duration of the measurement.

In practice, different models, varying amongst other things in their electronics, will be required for different applications. It is convenient to distinguish in particular two cases, one where the rotating system to be tested is housed in a stationary situation, and one where the rotating system is, for example, housed in a moving vehicle. The latter example also illustrates the case where the load varies, due to varying road conditions. The method is illustrated by considering how the effect of the varying and unknown load can be eliminated to yield the desired power measurement.

Introduce the following notation:
$N_A$ = torque produced by the engine
$N_B$ = torque associated with internal friction.
$N_C$ = torque associated with external physical quantities, such as gravity, road friction, etc.
$I_a$ = moment of inertia of engine systems
$I_b$ = moment of inertia of rear-wheel systems
$w_a$ = angular velocity of engine
$w_b$ = angular velocity of rear-wheel system (assuming rear-wheel drive)

The quantity $N_B$ will tend to diminish the useful effect of $N_A$; $N_C$ can act either to diminish it, e.g., by road friction and gravity acting on a vehicle moving uphill, or to enhance it, e.g., by gravity acting on a vehicle moving downhill. The sign convention chosen for these quantities is apparent from equation 5.

This then results in the basic equation set forth at the commencement of the description:

| rate of change of angul momentum of engine and rear-wheel systems | = | torque produced by engine | − | torque associated with internal friction | − | torque associated with external quantities | or, by the equation.

$$\sqrt{K} I_a \alpha_a + I_b \alpha_b = N_A - N_B - N_C$$

(5)

Since we consider a vehicle in gear, the angular velocities of engine and rear-wheel systems and their time rates of change are related to each other, a relation which we express by the equations $$\omega_a = \sqrt{K} \omega_b$$
$$\alpha_a = \sqrt{K} \alpha_b$$

(6)

here $K$ is a known number, which however depends on the gear the vehicle is in and the make and model of the vehicle.

Using equation 6 we can now eliminate one of two related quantities; say $\alpha_a$, from equation 5 to give $$(KI_a + I_b) \alpha_b = N_A - N_B - N_C$$

(7)

Under steady-state conditions, i.e., when the vehicle is not accelerating, we have $\alpha_b = 0$, and hence $N_A = N_B + N_C$, i.e.,

| torque produced by engine | = | torque associated with internal friction | + | torque associated with external quantities |

To measure by this method the torque produced by the engine, the measurement is made while the vehicle is accelerating (or decelerating), however slightly. To eliminate the effect of the varying and unknown load, two sets of measurements will need to be made as follows:

MEASUREMENT 1

Fuel Consumption greater than at idling

These are the conditions under which the torque $N_{A1}$ produced by the engine is to be determined. From equation 7 there is:

$$\alpha_{b1} = N_{A1} - N_B - N_C/K I_a + I_b$$

(8)

MEASUREMENT 2

Fuel Consumption at idling

This measurement is made under operating conditions by taking the foot off the accelerator while leaving the vehicle in gear. Under these conditions the torque produced by the engine is known and approximately equal to zero, $$N_A = N_{A2} \approx 0$$

We have from equation 7

$$\alpha_{b2} = N_{A2} - N_B - N_C/KI_a + I_b$$

(9)

Combining equations 8 and 9 the frictional torques are eliminated to obtain:

$$\alpha_{b2} - \alpha_{b1} = N_{A2} - N_{A1}/KI_a + I_b$$

(10)

or $$N_{A2} = N_{A1} + (KI_a + I_b)(\alpha_{b2} - \alpha_{b1})$$

(11)

The last equation gives the torque to be determined in terms of the known torque produced while idling, the known parameters ($K$, $I_a$, $I_b$) of the vehicle under the given operating conditions, and the two measured time rates of change of the angular velocities. This torque measurement combined with the measurement of the angular velocity will give the required power.

It has been tacitly assumed that the load and the internal friction do not change specifically between the two measurements.

Figure 2:
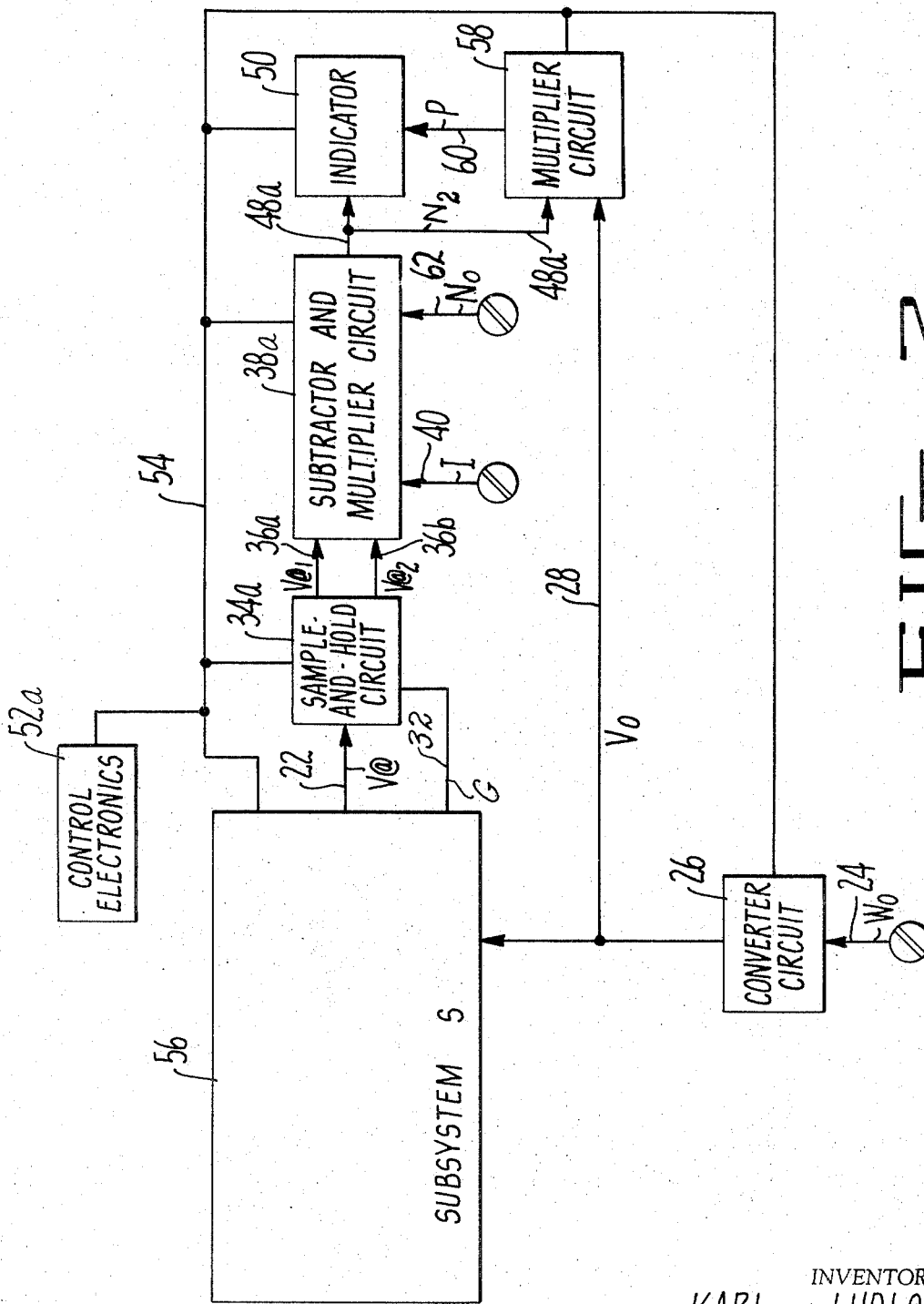
FIG. 2 is a block diagram of a torquemeter and a dynamometer circuit using some of the elements of FIG. 1, showing the method of eliminating the effect of slowly varying or fixed unknown loads.

Referring now more particularly to FIG. 2, to make these measurements, the selected value $\omega_o$, 24 is converted into electrical signal $V_o$, 28, as before and fed into Subsystem S, 56. An expanded sample-and-hold circuit 34a now stores the value of $\alpha$ corresponding to the condition in which $\omega$ is increasing through $\omega_o$, called $V\alpha_1$, 36a, and to the condition in which $\omega$ is decreasing through $\omega_o$, called $V\alpha_2$, 36b, on command from signal G 32, but with an expanded control electronics 52a, which must now enable and disable the comparator circuit 30 in a different manner and which must allow for the storage control for two storage elements. The new electronic circuit 38a must now take the difference between signals 36a and 36b before compensating for the known value of $I$, 40, for the rotating system. This is accomplished by conventional techniques. In addition, although input $l$, 46 is no longer required, an optional input 62, $N_o$ allows for the correction to the torque for the torque contribution when the system is in the quiescent state (for example, idling) should such a correction be necessary. The corrected value of torque to be determined is now called $N_2$, 48a. Circuit 58 combines signals 28 and 48a to yield the value of power 60 to be determined.

Figure 3:
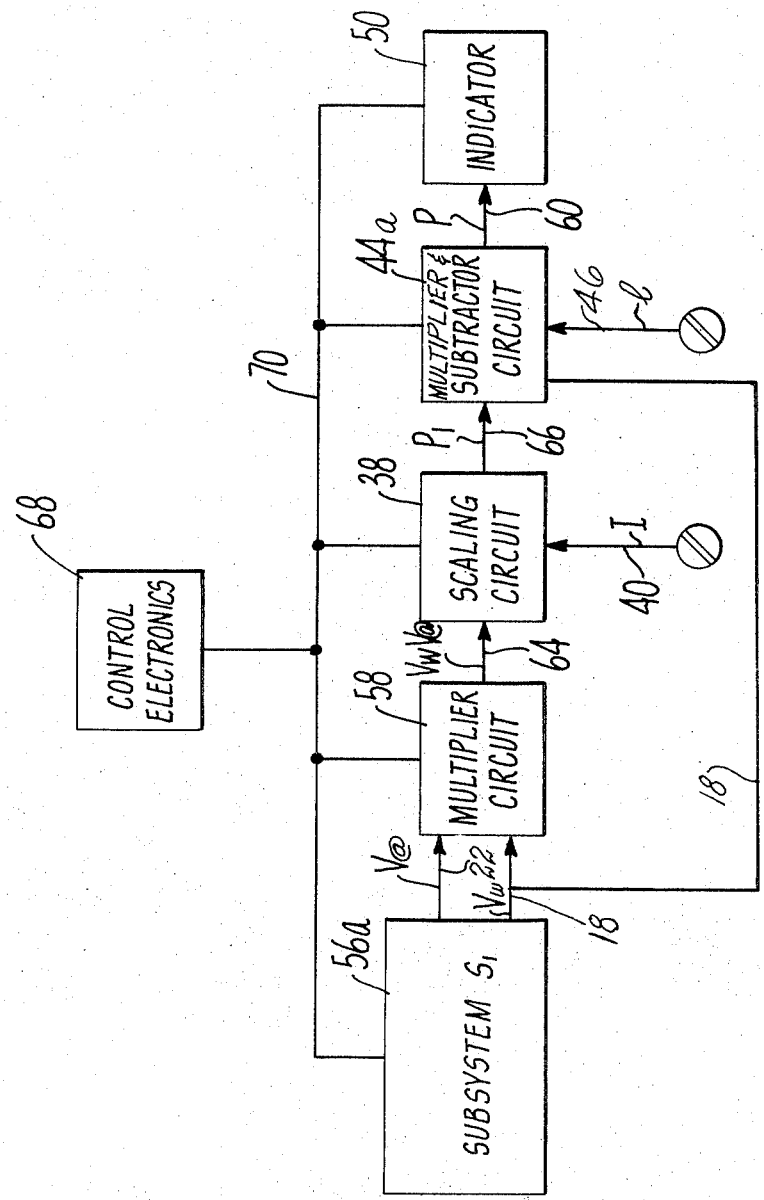
FIG. 3 is a block diagram for a continuous reading dynamometer.

A further example of the method of this invention is illustrated in FIG. 3 showing an example of a continuous reading dynamometer. A device of this method has wide application in many types of monitoring and control systems where a continuous determination of power is required. For simplicity, there is considered the situation where the losses can be constant or slowly varying as described in connection with FIG. 1, although this is not a necessary requirement of a continuous reading dynamometer.

The dynamometer of FIG. 1 can be easily converted to a continuous reading dynamometer, shown in FIG. 3. The subsystem of elements 10 through 22 in FIG. 1, which are described above, form a subsystem which will herein be referred to as Subsystem $S_1$, 56a. Its outputs are 22, $V\alpha$ and 18, $V\omega$. The circuit 58 mixes the signal 18, $V\omega$ with the signal 22, $V\alpha$ to yield the output signal 64, $V\omega V\alpha$, equal to the product of 18 and 22. Electronic circuit 38 functions to account for the known moment of inertia 40, I of the system to yield an uncorrected power 66, $P_1$. Electronic circuit 44a functions to compensate for system losses 46, $l$ to yield the corrected value of power 60, $P$ to be determined. Indicator circuit 50 functions to display or record said value of $P$, 60 to be determined. Again, an optional electronic circuit 68 can be utilized to perform any necessary conventional tasks, such as resetting a circuit, via control lines 70.

Such a continuous dynamometer would, for example, play a crucial, perhaps decisive, role in under-the-hood monitoring and control systems for automobiles, whose adoption appears to be forced by the kind of stringent pollution-control and safety requirements that have already been enacted in part. To ensure less exhaust pollution, for example, involves more efficient operation of the motors, which in turn requires monitoring a number of performance characteristics, amongst which power is one of the most crucial, during the vehicle's normal operating conditions. A weak-probe compact dynamometer, such as the one described herein, is essential for this purpose. The control system would then correlate quantities such as engine temperature, engine speed and power to regulate other performance characteristics, such as the fuel-injection mixture and ignition timing.

Throughout the drawings the symbol ⓛ represents a manually adjusted input of known or predetermined values. An arrow indicates a signal path and no arrow on the line means a control circuit.

I claim:

1. A method of determining the torque of a rotating element in a system having at least one rotating element and having constant or sufficiently slowly varying losses and/or load, without the necessity of appreciable perturbation of the operation of the system, said method comprising, establishing the angular acceleration value of the rotating element, relating the established angular acceleration value to the known inertial properties of said system and the unknown losses or unknown load or both each determinable by angular-acceleration measurements, eliminating the loss and load dependence by taking the difference between two measurements of angular acceleration taken at the same angular velocity, and making the result available for torque readout.

2. The method of claim 1, where the torque readout may be obtained at any state of operation of the system and where the friction losses and the load are variable.

3. A method of determining the power of a rotating system having a rotating element and with constant or sufficiently slowly varying losses and/or load, without requiring appreciable perturbation of the operation of the system, said method comprising, simultaneous determination of angular acceleration or torque, and angular velocity, providing a circuit for relating the determination of angular acceleration or torque and angular velocity to that of power, using the known inertial properties of said system and, when either or both the losses or load are unknown the value of each unknown quantity, determinable by angular-acceleration measurements, elimination of the power's dependence on the unknown load or frictional losses by taking the difference between two measurements of angular acceleration taken at the same angular velocity, and making the result available for power readout.

4. The method of claim 3 where the power readout is obtained at any state of operation and when either or both the known or determinable friction losses and load are variable.

5. A method for determining the torque of a rotating system having a rotating element and having varying losses and/or load and known inertial properties, without the necessity of appreciable perturbation of the operation of the system, said method comprising a measurement by a controlled means at a particular angular velocity of angular acceleration of said rotating element of said system, said system generating unknown torque, using said measurement of angular acceleration to relate torque to the known inertial properties of said system and to the determinable losses or load or both, determining said loss and/or load contribution to the rate of change of angular momentum by isolating their effect on angular acceleration through a second measurement at same said angular velocity of angular acceleration with said rotating system generating known torque, eliminating said loss and/or load dependence from the rate of change of angular momentum of said rotating element by taking the difference between said two measurements of angular acceleration at same said angular velocity, and averaging as many measurements as may be required to establish to specified accuracy the torque of the rotating system and/or the losses and load, and making said determined torque and/or said determined losses and load available for further use.

6. The method of claim 5 wherein the losses and the load are constant or slowly varying.

7. A method for determining the power of a rotating system having at least one rotating element and having varying losses and/or load and known inertial properties, without requiring appreciable perturbation of the operation of the system, said method comprising, determination of torque and/or losses and load by the method of claim 19 wherein the particular angular velocity at which the torque and/or losses and load determinations are made is measured simultaneously with said torque and/or losses and load determinations, multiplying said torque and/or losses and load by said angular velocity to obtain the power generated by the rotating system and/or the power going into the losses and load, and making these results available for further use.

8. The method of claim 7 wherein the losses and load are constant or slowly varying.

* * * * *